United States Patent
Krishnaswamy et al.

(10) Patent No.: US 8,090,378 B2
(45) Date of Patent: Jan. 3, 2012

(54) COLOR CODE REUSE FOR CELLULAR SYSTEMS

(75) Inventors: Mahesh Krishnaswamy, Palatine, IL (US); Michael N. Kloos, Belvidere, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1051 days.

(21) Appl. No.: 11/954,284

(22) Filed: Dec. 12, 2007

(65) Prior Publication Data

US 2009/0156223 A1      Jun. 18, 2009

(51) Int. Cl.
*H04W 40/00* (2009.01)
(52) U.S. Cl. ........................................... 455/446
(58) Field of Classification Search ............... 455/446
See application file for complete search history.

(56) References Cited

U.S. PATENT DOCUMENTS

| | | | |
|---|---|---|---|
| 6,154,654 A | 11/2000 | Mao | |
| 6,272,122 B1 * | 8/2001 | Wee | 370/342 |
| 6,497,599 B1 | 12/2002 | Johnson et al. | |
| 6,507,742 B1 * | 1/2003 | Lin et al. | 455/446 |
| 6,577,869 B1 | 6/2003 | Garrison | |
| 6,597,677 B1 * | 7/2003 | Segawa | 370/342 |
| 6,925,066 B1 | 8/2005 | Chekuri et al. | |
| 7,158,593 B2 | 1/2007 | Kim et al. | |
| 2002/0159405 A1 | 10/2002 | Garrison et al. | |
| 2004/0085988 A1 * | 5/2004 | Gardner et al. | 370/441 |
| 2005/0265293 A1 | 12/2005 | Ro et al. | |

FOREIGN PATENT DOCUMENTS

KR     1020040013604 A      2/2004

OTHER PUBLICATIONS

Eastwick, G. et al.: Concentric Cell Handover and Assignment Algorithms, IPCOM000007872D, ip.com, Original publication Date: Nov. 1, 1996, IP.com Electronic Publication: May 1, 2002, pp. 75-76.

* cited by examiner

*Primary Examiner* — Patrick Edouard
*Assistant Examiner* — Shantell L Heiber

(57) ABSTRACT

A method for configuring color codes in a cellular telephone network is disclosed. The method includes calculating a distance between all possible color codes to be assigned to each of the cells in the network, assigning a first code to a first base station, determining a second code corresponding to a maximum calculated distance from the first code, and assigning subsequent codes to adjacent cells as determined by the maximum available distance between the two neighboring cells' codes to help minimize cross talk and channel interference on the cellular network.

17 Claims, 8 Drawing Sheets

COLOR CODE REUSE FOR CELLULAR SYSTEMS

TECHNICAL FIELD

The present invention relates generally to mobile wireless communications networks, and in particular, a method to reduce cross channel interference and cross talk in a cellular system, both within a mobile telephone switching office and between mobile telephone switching offices. The present invention relates generally to the assignment of color codes to cells in order to minimize the cross talk. More specifically, embodiments of the present invention are related to methods that allow assignment of color codes based on a coding scheme and distances between assigned color code symbols in the transmission.

BACKGROUND

A cellular telephone is a two radio transceiver communicating with a network of base stations as the mobile subscriber travels through the service area. The base stations are connected to a mobile telephone switching office (hereinafter "MSO"). The MSO links the cellular network to the land based public switch telephone network (hereinafter "PSTN"). A series of signals passes between a wireless mobile cellular device and a mobile base station. These signals enable the wireless mobile device or telephone to operate in a similar fashion as a wired land line phone.

The cellular system uses a finite number of frequencies that are shared amongst the multiple wireless telephone devices communicating through the cellular system. As such, it is possible that a mobile unit may receive signals from more than one base-station at one time. It is also possible that as a mobile unit moves through a coverage area, the signal strength of the transmitted or received signal may fall below a useable level. Other fading and interference effects may also prevent a clear connection. Further, the mobile may implement a scheme called discontinuous transmission (hereinafter "DTx") in which speech is only transmitted when it is present. In order to handle these problems, the cellular base-station transmits "color code" symbols. Color code symbols are dedicated digital symbols in the transmission assigned to cells within the system. When a mobile device receives and decodes a signal, the mobile device then checks that the color code symbol received matches the color code for the service area cell to which the mobile device is currently assigned. If the color code does not match, the speech is discarded and not played out. Color code matching prevents cross talk in a speech conversation. Color code matching is done from the base-station to the mobile device as well as in a reverse direction. During a conversation, both the base-station and the mobile device continuously send the assigned color codes to each other, embedded in the transmission In order to place a call, a user enters the desired number and presses send on their mobile device. The phone quickly measures the signal strength on the active access channels, and tunes to the strongest available signal strength. The mobile device then transmits identifying information and the number to call to the base-station. The base-station forwards this same information to the MSO. The base-station sets up the channel, using the appropriate color code for the cell, and begins sending the assigned color code embedded in the transmission to the mobile device. The MSO also out-pulses the call number to the PSTN, if the device is calling a land line telephone; or sends a paging message if the device is calling another mobile device. The mobile device receives and decodes the assigned voice channel and verifies that the color code is correct. If the color code is correct, the mobile device decodes the audio to the handset speaker. The base-station detects a reverse color code that the mobile device is sending. The base-station also un-mutes the reverse audio provided that the color code is correct. The checking of the color code is done on a frame-by-frame basis in both directions, independently.

The color codes not only assist in reducing interference, they also allow frequency reuse across sites and cellular networks. The frequency reused in geographically separated cells ensures radio spectrum efficiency but introduces undesirable co-channel interference that may result in dropped calls, hand off failure or cross talk in cases when the color codes are misinterpreted due to noise, resulting in a symbol error. What is needed is a method and a system that can be deployed to eliminate or reduce cross channel interference resulting in dropped calls, hand off failure or cross talk experienced by a mobile device user.

SUMMARY

In one aspect thereof, a method of assigning color codes to wireless cellular communication base-stations is disclosed. The system enables an operator at a Mobile Switching Office ("MSO") to optimally configure the color codes to reduce or eliminate cross channel interference resulting in dropped calls, hand off failure, or cross talk.

The method assigns color codes to the cells and computes a relationship value between the codes. Therefore, the operator at an MSO is able to mathematically compute an optimal configuration for assignment of the color codes across cells in the system. The operator may use an iterative method of assignment to achieve optimal configuration.

Additionally, operators of separate MSOs will be able to coordinate their cellular color code assignments to reduce cross channel interference occurring at the boundaries of the separate MSOs. Therefore, an optimal wireless cellular system configuration can be achieved which minimizes probability of crosstalk within the system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
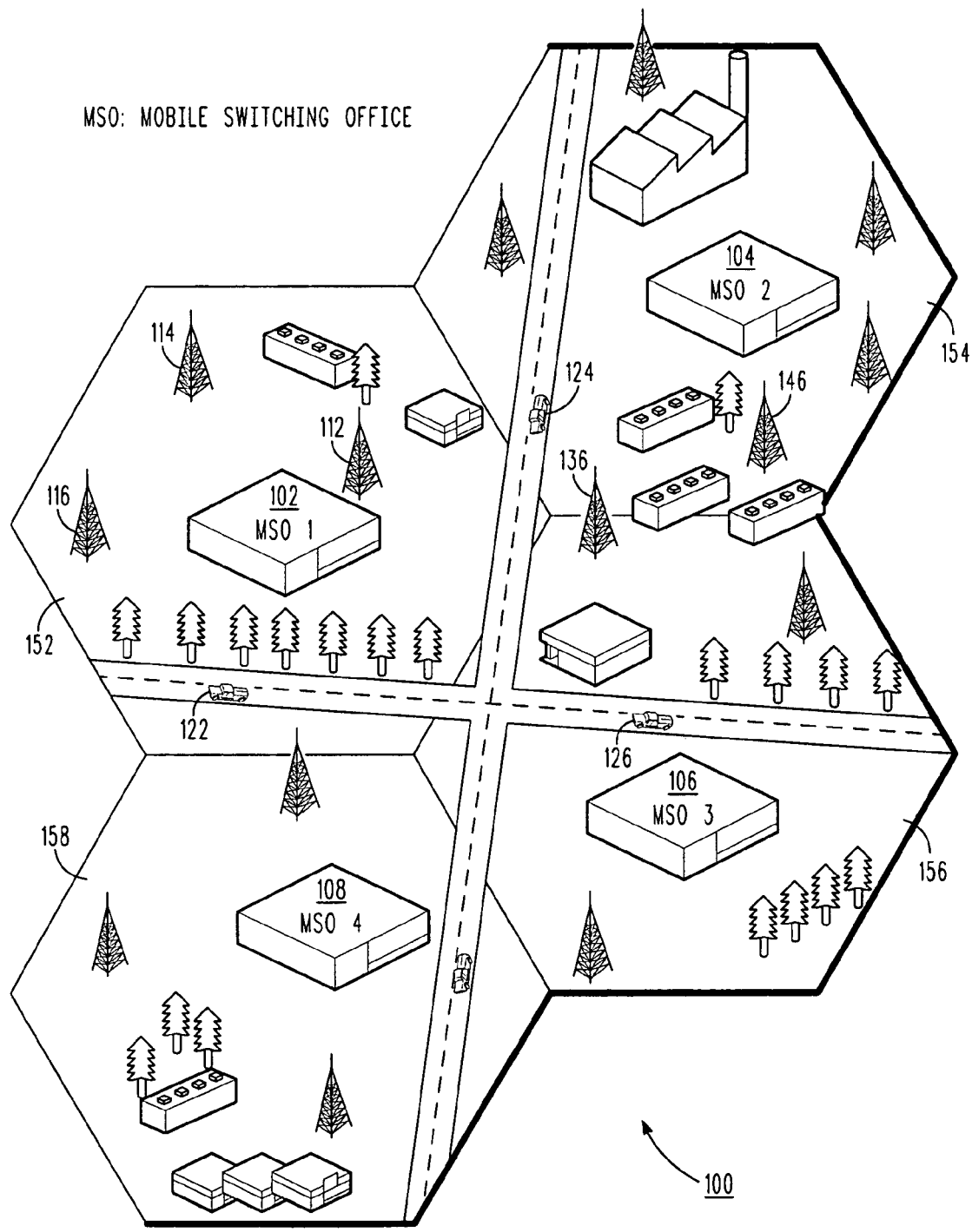
FIG. 1 is an exemplary wireless system containing four mobile telephone switching offices (MSO)

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an improved color coding scheme ("color code") reuse techniques for cellular systems. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of improved color code reuse for cellular systems described herein. The non-processor circuits may include, but are not limited to, a radio receiver, a radio transmitter, signal drivers, clock circuits, power source circuits, and user input devices. As such, these functions may be interpreted as steps of a method to perform improved color code reuse for cellular systems. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Methods for assigning color codes to base stations in a mobile telephone switching office and coordinating the assignment of the color codes between two or more mobile telephone switching offices is disclosed. The various methods include calculating a distance between the color codes, assigning color codes to base stations based on a maximum calculated distance between base stations. The method also includes randomly assigning color codes to a base station, computing metrics of distances to and among all of the neighbor base stations and iterating this process until a total distant metric is maximized. The method may also include a combination of randomly assigning the color codes to base stations and computing the maximum distance between color coded base stations.

Referring now to FIG. 1, a wireless cellular system in accordance with some embodiments of the invention is shown. The wireless network 100 includes multiple mobile switching offices ("MSO") 102, 104, 106 and 108. Each MSO 102, 104, 106 and 108 is in cellular communication with multiple base-stations within a MSO service area 152, 154, 156, 158. For example, MSO1 102 is in cellular communication with base-stations 112, 114 and 116. A mobile device 122 traveling through the service area 152 MSO1 102 can communicate with base-station 116. As mobile device 122 travels through the service area 152 of MSO1 102, the mobile device 122 can transfer its wireless signal from base-station 116 to base-station 112 as the signal strength weakens at base-station 116 and strengthens at base-station 112. When a new mobile device 124 enters the service area 152 of MSO1 102 and establishes a communication link using base-station 112, an MSO1 102 assigned color code is used on the channel that the new mobile device 124 will be using. The color code used by mobile device 124 previously was assigned by the MSO1 102 to a service area cell of the base-station 112. The assignment of the color codes to the service area cells reduces or eliminates cross channel interference between the new mobile device 124 and mobile device 122 if they are operating on the same channel within the same service area 152 of MSO1 102. Additionally, a mobile device 126 operating in the service area 156 of MSO3 106 can be communicating through base-station 136. The MSO3 106 assigns a color code to the cell used by base-station 136. At the same time, the new mobile device 124 traveling from the service area 152 of MSO2 104 into the service area 156 of MSO3 106 may be transferred from the base-station 146 to the base-station 136.

Figure 2:
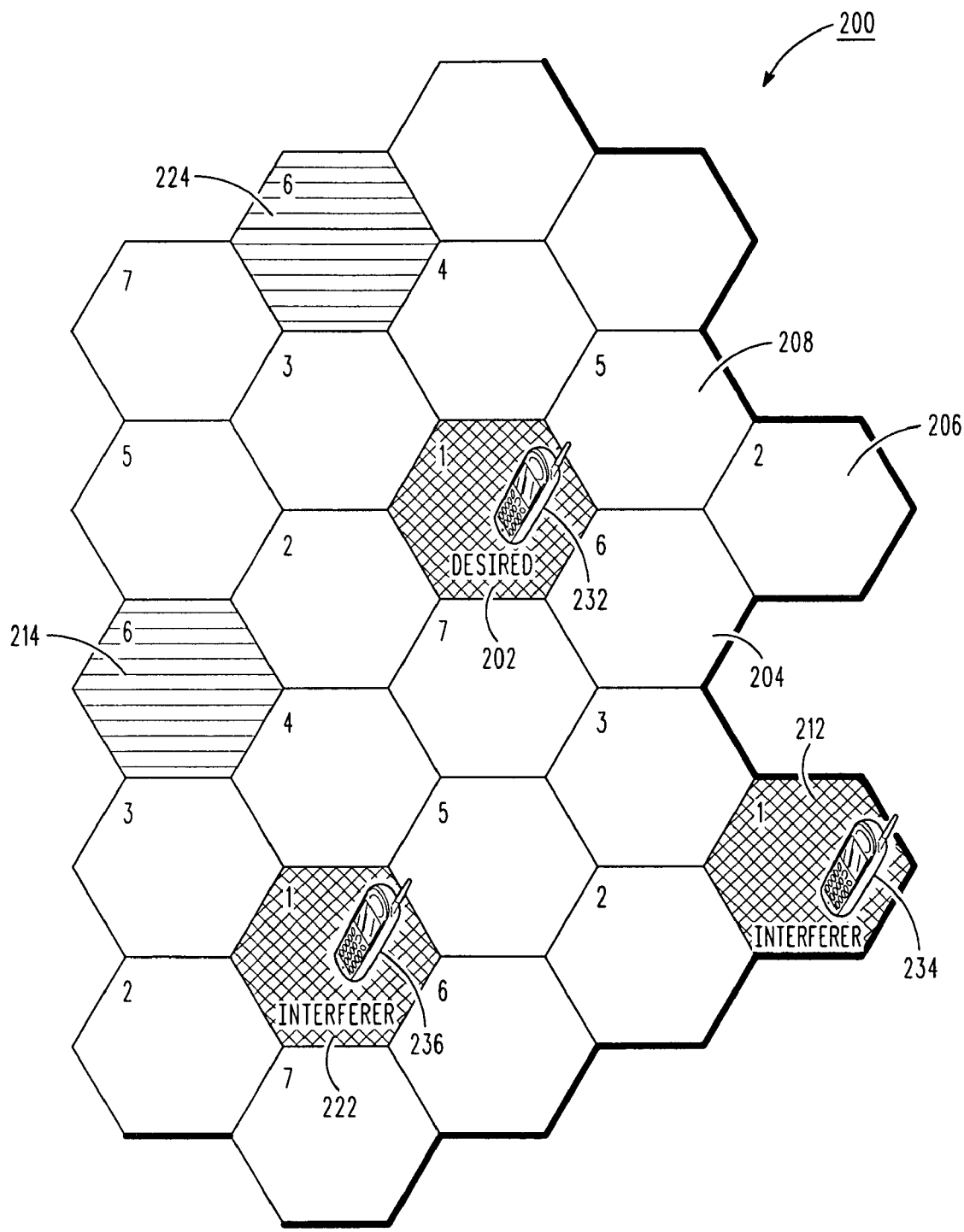
FIG. 2 is an example of the cells of the base stations of the mobile telephone switching office.

Referring now to FIG. 2, service area cells defined by the base stations of a mobile switching office in accordance with embodiments of the present invention are shown. Each service area cell (hereinafter "cell") corresponds to the service area of a base-station. The cells are substantially adjacent to each other; although, some overlap exists between the cellular service areas of the base-stations. Each base-station includes multiple transceivers. The MSO, for example MSO1 102, assigns a color code to each base-station. As such, numbers within the cells reflect the different color codes for each cell of the base-station within a wireless communication network. For example, cell 202 could be assigned color code 1, cell 206 could be assigned a color code 2, cell 204 could be assigned a color code 6, and cell 208 could be assigned color code 5, etc. However, the MSO assigns a finite number of color codes. As such, color codes may be reused. For example, the MSO assigns color code 6 to cells 214 and 224. Additionally, the MSO assigns color code one (1) to cells 202, 212 and 222 respectively. For example, in an Integrated Digital Enhanced Network (hereinafter "iDEN") system, sixteen values of color codes are composed of the repeated Quadrature Phase Shift Keyed (hereinafter "QPSK") symbol pairs that are used by the base station. Different color codes do not have to have the same distance properties from each other. Embodiments of the present invention take into account the different color code distance properties when establishing a reuse pattern. The reuse pattern is the assignments made by the MSO wherein the color codes are reused within an MSO coverage area. As such, an optimal color code usage is obtained.

Referring back to FIG. 2, the base station assigns a channel to a mobile device user 232 in cell 202. Additionally, the base-station uses the color code, previously assigned by the MSO (for example MSO1 102) and channel to communicate with a mobile device user 234 in cell 212. The base station in cell 222 is assigned a matching color code and channel and uses this color code/channel pair to communicate to a mobile device 236 in cell 222. As such, the mobile device 232 user in cell 1 202 can experience interference or cross talk resulting from the mobile device 234 in cell 212 and the mobile device 236 in cell 222 since the color codes and channels match that of the mobile device 232 in cell 202.

Figure 3A:
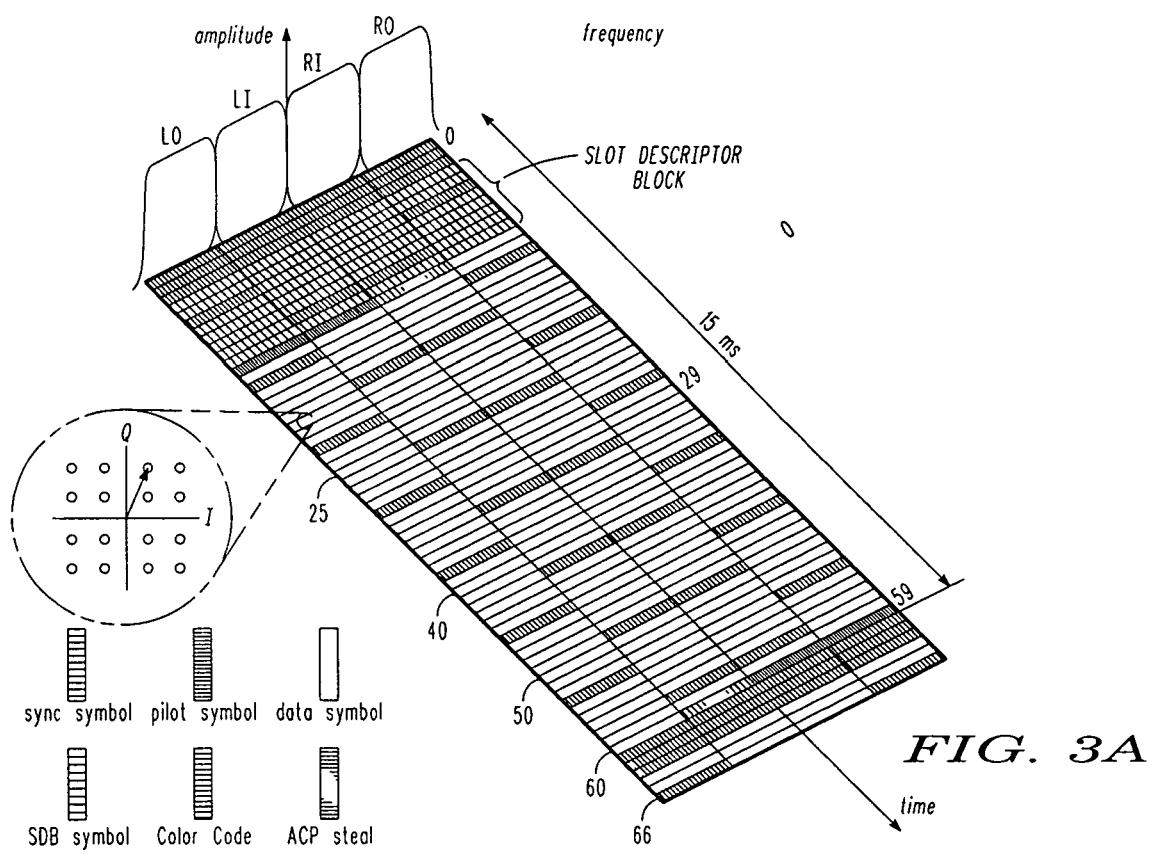
FIG. 3A is an exemplary time-code slot in accordance with some embodiments of the invention.

The base station assigns to each mobile device user a time slot (hereinafter "slot"). An exemplary time-slot is illustrated in FIG. 3A. The base-station assigns additional slots to additional users as requested. As such, every mobile device user gets a slot that is periodic in nature. During the user's time slot, the user transmits digital information over the channel assigned to the cell that the user is communicating through. The mobile device 232 transmits the digital data in Quadrature Amplitude Modulated (hereinafter "QAM") symbols. As such, the data symbols are 16QAM modulation. The data symbols are error correction coded. These data symbols contain a synchronization pattern at the front of the time slot. The base-station uses the synchronization pattern to lock onto an incoming signal's timing. The base-station also uses the synchronization pattern to demodulate the symbols of the time slot. Since every symbol of the 16QAM provides 4 bits, the base-station runs the four bits through an error code detection receiver wherein the useable bits are extracted.

Some systems, such as iDEN systems, use discontinuous transmit (DTx) techniques to save battery life. DTX is an operating condition whereby when a user is not speaking; the mobile device of the user does not transmit packets. Using DTx takes advantage of the fact that in a normal conversation, speech is being spoken roughly half the time; the remainder of the time the user is listening. DTx is exploited in order to save bandwidth and battery life, by only transmitting when speech is present.

A situation can exist wherein a mobile device user goes into DTX causing the base-station to no longer receive a strong signal from the mobile device user. However, the base-station may be receiving weaker signals from another ("interfering") mobile device user (not shown) transmitting through substantially adjacent base stations (for example, the base-station providing cellular service to cell 208 or the base-station providing cellular service to cell 204), but during the same time slot as the first mobile device 232. The second or alternate (interfering) mobile device user may be delayed minutely from the time slot occupied by the first mobile device 232 because of propagation delay. However, this delay is small enough to still allow the signal to fit into the reception window of the base-station. For example, the first mobile device user may be at the edge of the first base-station service area (cell 202) and the second mobile device user may be at an edge of a substantially adjacent base-station service area (cells 204, 208) such that there is very little difference between them and therefore, very little propagation delay exists. Therefore, the first mobile device synchronizes with the signal from the interfering subscriber. It is possible, during these circumstances, that co-channel transmissions from other cells may be received instead of the desired signal. When this occurs, cross talk occurs: i.e., portions of another call's speech may be periodically substituted into the conversation. The first mobile device 232 would decode the bits from the interfering subscriber properly because both of the mobile devices are using the same error correction scheme. As a result, the first mobile device 232 would play the audio from the interfering mobile device user. Obviously, this is extremely undesirable.

Figure 3B:
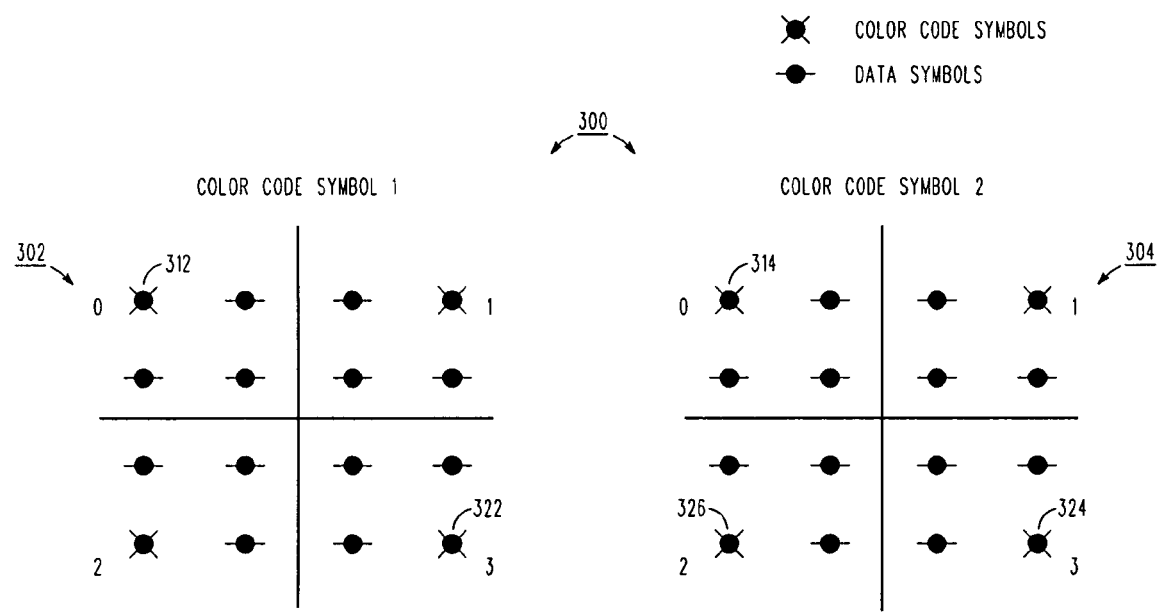
FIG. 3B is an exemplary color code table in accordance with some embodiments of the invention.

Referring now to FIG. 3B, exemplary color code tables in accordance with embodiments of the present invention are shown. A color code 300 has two reserve symbols, color code symbol one (1) 302 and color code symbol two (2) 304, transmitted at the beginning of the time slot and two to reserve symbols 302 and 304 transmitted at the end of a time slot as illustrated in FIG. 3A. The base-station transmits the color code 300 in QPSK. Transmitting the color code 300 as QPSK makes it a very identifiable marker in the signal. The color code 300 is comprised of a color code symbol one 302 and a color code symbol two 304. Color code symbol one 302 has four possible values represented by zero (0), one (1), two (2) or three (3). Color code symbol two (2) 304 has four possible values as represented by zero (0), one (1), two (2) or three (3). The combination of color code symbol one 302 and color code symbol two (2) 304 yields sixteen possible values resulting from each symbol having four possible values. As such, color code 300 has sixteen possible values as represented by Table 1.1.

TABLE 1.1

| | |
|---|---|
| 0 | 0 |
| 0 | 1 |
| 0 | 2 |
| 0 | 3 |
| 1 | 0 |
| 1 | 1 |
| 1 | 2 |
| 1 | 3 |
| 2 | 0 |
| 2 | 1 |
| 2 | 2 |
| 2 | 3 |
| 3 | 0 |
| 3 | 1 |
| 3 | 2 |
| 3 | 3 |

Each color code has distance properties that relate to other color codes. For example, for a given color code combination, other codes are not the same distance away. Color code distance for two symbols is a distance as measured in four dimensional space. The distance between two color codes is calculated through the use of Euclidean math. An example equation representing a distance from 00 to 33 would be $SQRT(6^2+6^2+6^2+6^2)=2\sqrt{36}=12$. The distances between each color code is represented in Table 2.1. A color code of 00 could be represented by a point zero (0) 312 of color code symbol one (1) 302 and a point zero (0) 314 of color code symbol two (2) 304. The color code of 33 could be represented by a point three (3) 322 on color code symbol one (1) 302 and a point three (3) 324 on color code symbol two (2) 304. A color code of 00 could be represented by a point zero (0) 312 of color code symbol one (1) 302 and a point zero (0) 314 of color code symbol two (2) 304. The color code of 33 could be represented by a point three (3) 322 on color code symbol one (1) 302 and a point three (3) 326 on color code symbol two (2) 304. The distance between color code 00 and color code 32 can be calculated using the equation SQRT($6^2$+$6^2$+$6^2$)=6√3=12. Table 2.1 represents the Euclidean distances between color code 00 and the remaining color codes available. It can be appreciated that the term color code is used for representational purposes only and that any other nomenclature representing a code could be used.

TABLE 2.1

| Color Code | Distance | Preferable |
|---|---|---|
| 3 3 | 12 | Best |
| 3 2, 3 1, 1 3, 2 3 | 6√3 | Good |
| 1 1, 2 2, 1 2, 2 1, 0 3, 3 0 | 6√2 | Fair |
| 1 0, 0 1, 2 0, 0 2 | 6 | Worst |

The use of color codes at the beginning of the time slots and at the end of the time slots helps distinguish one cell from the next when the system is reusing the frequencies as described herein above with respect to FIG. 1. Most systems are designed for the finite number of frequencies due to cost constraints of acquiring frequencies, licensing for the frequencies and management of the multiple frequencies on the system. Therefore, as frequencies get reused, the color coding of the signals helps the base-station towers distinguish between two signals on the same frequency.

Figure 4A:
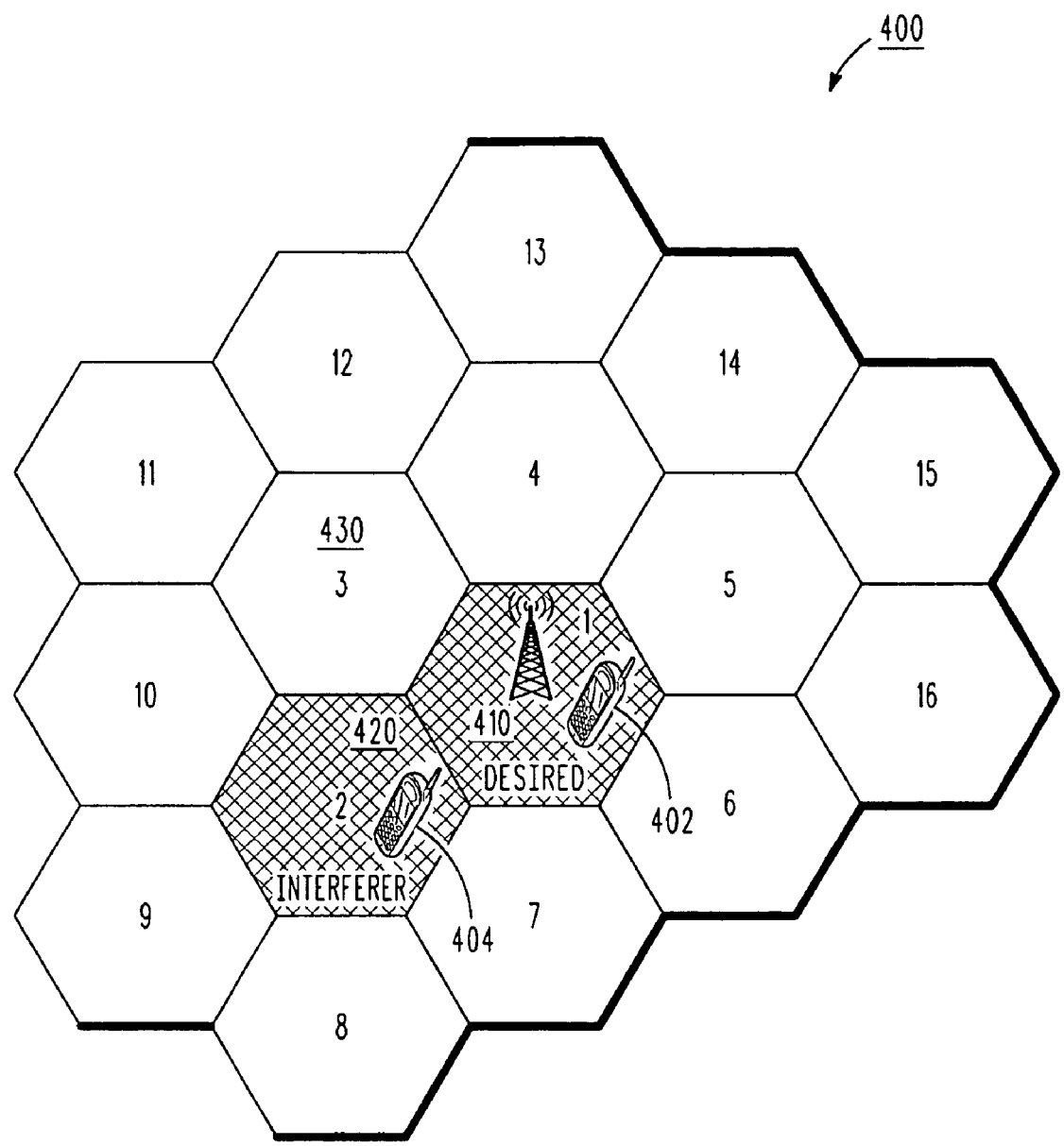
FIG. 4A is an example of the cells of the base stations of a mobile telephone switching office in accordance with embodiments of the present invention.

Referring now to FIG. 4, an exemplary cellular configuration of a multiple switching office in accordance with embodiments of the present invention is shown. A MSO service area 400 has multiple cells within its service area. Each cell is the wireless coverage area provided by a given base-station. A wireless user 402 can be operating on a base-station covering the cellular area 410. Another wireless user 404 is operating in a substantially adjacent cellular area as provided from another base-station 420. Another base-station, which is substantially adjacent to the first and second base-stations, can be providing cellular service to the cellular area 430. The cellular coverage areas of the base-stations are substantially adjacent to each other such that portion of their cellular coverage areas may overlap each other.

The MSO assigns a color code to cell one 402. The MSO assigns color code 00 to cell one 402. Then, the MSO assigns a color code to cell two 420. The MSO, referring to Table 2.1, determines that color code 33 has best preferable distance from color code 00. The distance between color code 00 and color code 33 is reflected in the Distance column as being 12. Therefore, the MSO assigns color code 33 to cell two 420. The MSO proceeds to assign a color code to cell three 430. Again referring to Table 2.1, since the Best color code of 33 has just been assigned to cell two 420, the MSO determines that the best available distances as compared to color code 00 are found in the good row under Preferable column. The preferable color code values found within the good row are 32, 31, 13, and 23. The distance reflected for the good row is 6√3. However, the MSO uses Table 2.2 to find the best available distance between cell three 430 and cell two 420. Using Table 2.2 the MSO determines that the values 13, 31, 23 and 32, which were good for the relationship between cell three 430 and cell one 410, are now the worst preferable condition with a distance of six as compared between cell three 430 and cell two 420. The MSO determines that the highest preferable distance that cell one 410 and cell two 420 share in relation to cell three 430 is color codes 11, 22, 12, 21, 03, and 30. Both Table 2.1 and Table 2.2 reflect this row as being Fair with a distance of 6√2. Therefore, the MSO assigns a color code value of 11 to cell three 430. It can be appreciated that the MSO could have assigned color code 22, 12, 21, 03 or 30.

TABLE 2.2

| Color Code | Distance | Preferable |
|---|---|---|
| 0 0 | 12 | Best |
| 0 2, 0 1, 1 0, 2 0 | 6√3 | Good |
| 1 1, 2 2, 1 2, 2 1, 0 3, 3 0 | 6√2 | Fair |
| 1 3, 3 1, 2 3, 3 2 | 6 | Worst |

Figure 4B:
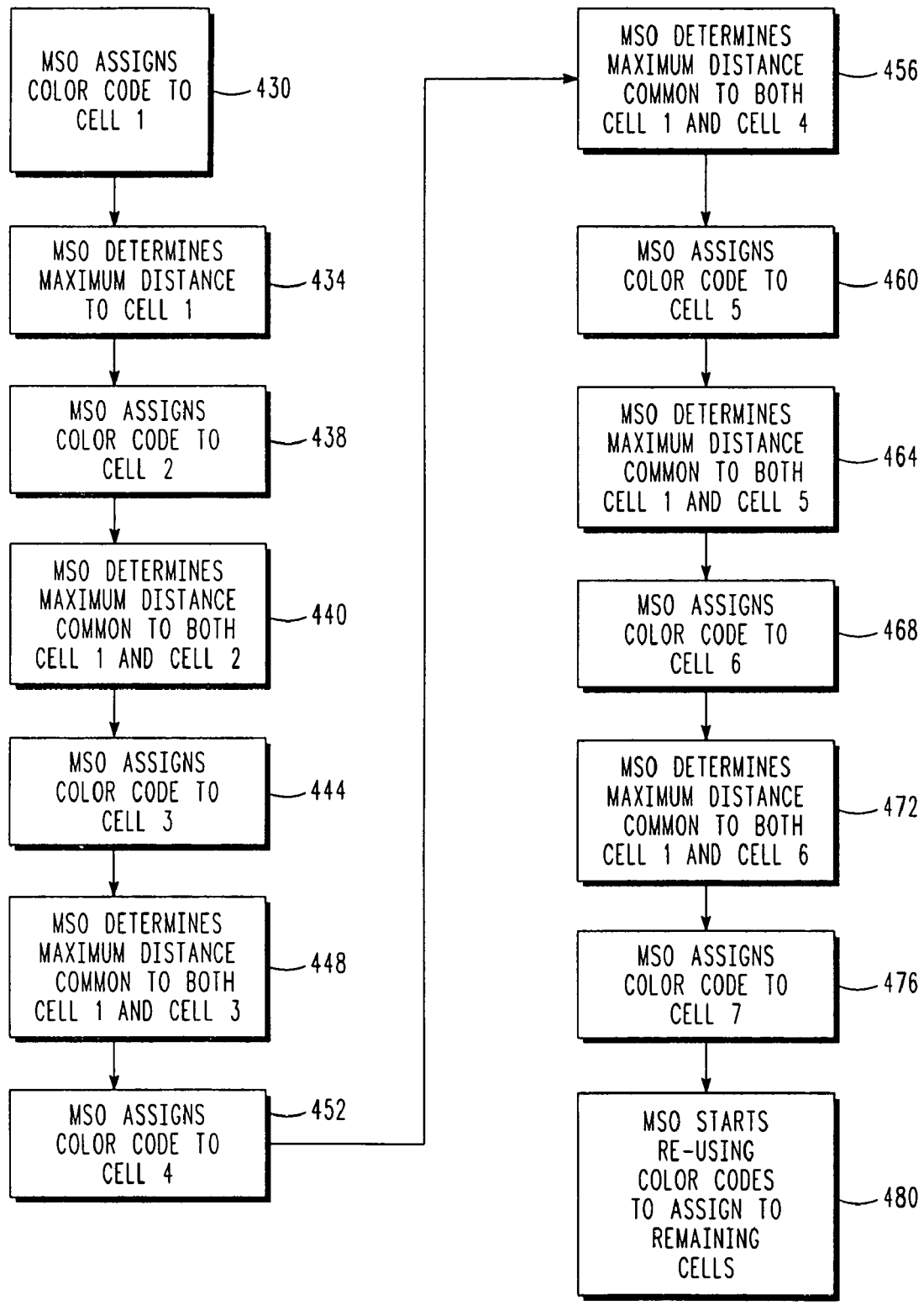
FIG. 4B is a flow chart for configuring the color code assignments in accordance with embodiments of the present invention.

Referring to FIG. 4B, an exemplary flow chart in accordance with embodiments of the present invention is shown. In step 430 the MSO assigns a color code to cell one. The color code assigned can be color code 00. The MSO then moves on to step 434 where the MSO determines a color code corresponding to the maximum distance from the color code assigned to cell one, which for example, is color code 00. The MSO then assigns the color code found in step 434 to cell two. The MSO, in step 440, determines the color code having a maximum distance to the color codes of both cell one and cell two. In step 444, the MSO assigns the color code found in step 440 to cell three. In step 448 the MSO determines the color code having a maximum distance in common to the color codes of both cell one and cell three. In step 452 and 456 the MSO again determines the color code having a maximum distance in common to the color codes of both one and four. The MSO then assigns that color code corresponding to that maximum distance to cell five. In step 460 and 464 the MSO again determines a color code having a maximum distance in common to the color codes above cells one and five. The MSO then assigns 468 the color code found to be corresponding to the maximum distance between cells one and five to cell six. The MSO then moves on to steps 472 and 476, the MSO determines the color code having a maximum distance to the color codes above cells one and six and assigns that color code to cell seven. Thereafter, the MSO will begin to reuse the cellular color codes. The MSO assigns the color codes again based on the maximum distance available from both the substantially adjacent cells.

Figure 5:
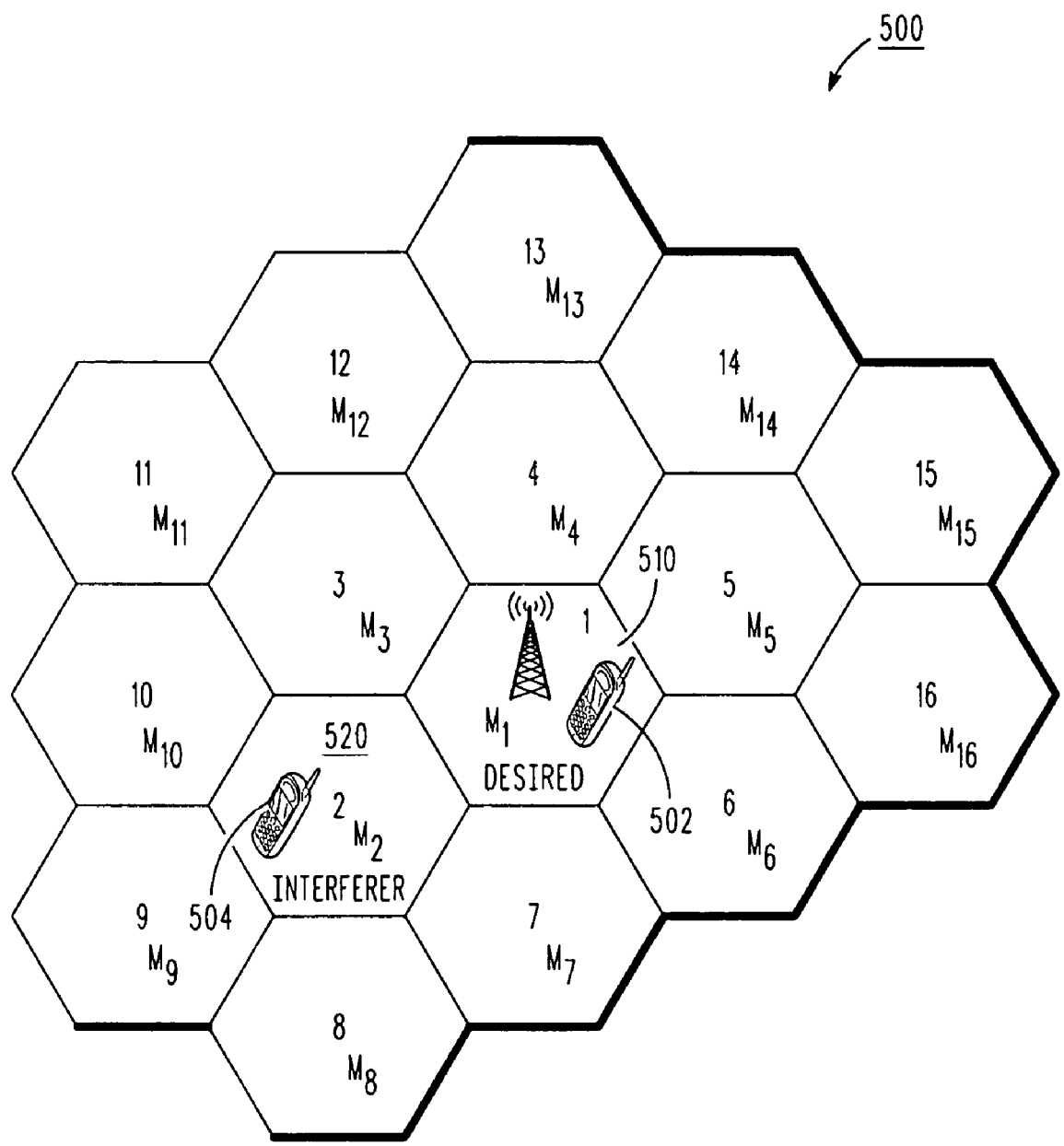
FIG. 5 is an example of the cells of the base stations of a mobile telephone switching office configured by an iterative process in accordance with embodiments of the present invention.

Referring now to FIG. 5, the cellular structure of an MSO in accordance with embodiments of the present invention is shown. The MSO randomly assigns a color code to cell one 510. The MSO then randomly assigns color codes to each cell adjoining cell one 510. Therefore, the MSO assigns a color code to cell 520. As such, a mobile device, such as a cellular telephone, used 502 in cell one 510 can carry on a desired communication without interference from a cellular user 504 in cell two 520. In order to accomplish this, the MSO finds a distance metric for each cell to all the neighboring cells. The metric is found by Equation 1.

$$M_k = \text{sum}(d^i). \quad \text{Equation 1}$$

Additionally, the MSO computes a composite metric for the entire network. The composite metric is computed by Equation 3.

$$\text{Composite Metric}_k = \max(\text{sum}(M_k)). \quad \text{Equation 3}$$

Then, the MSO iterates new random assignments for all the cells. After new color codes have been randomly assigned to all the cells, the MSO again computes a maximum distance metric for each cell and a composite metric for the network. The MSO continues the iteration process until a minimum composite metric is found.

Figure 6:
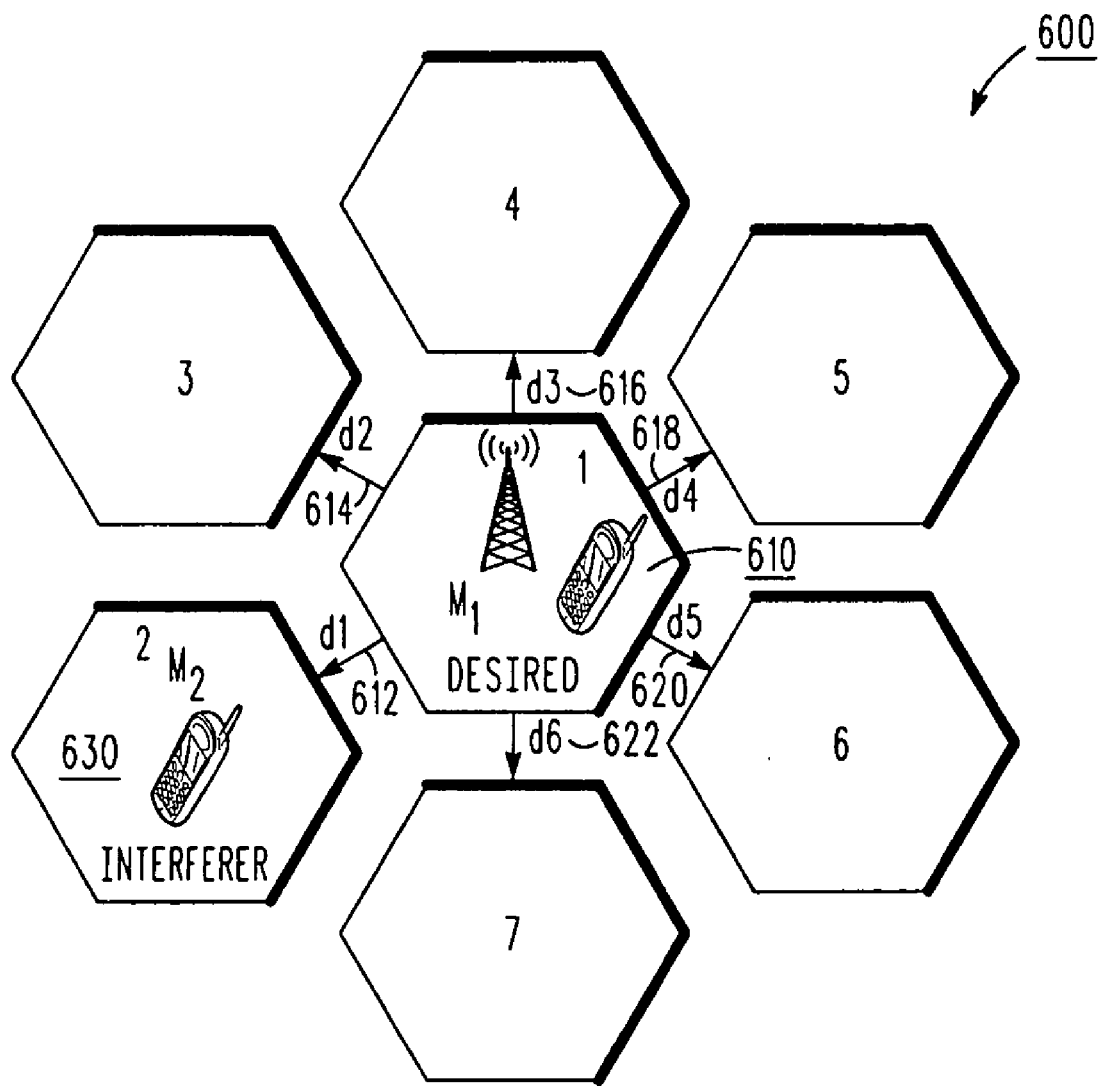
FIG. 6 is an example of the distance metrics between the cells of the base stations of a mobile telephone switching office in accordance with embodiments of the present invention.

As can be seen, a metric value for cell 1 would be a sum of all the distances between cell one and each of its neighboring cells. The composite metric for the network would be a maximum of the sum of all the metrics of each cell contained within the MSO. As illustrated by FIG. 6, M1 would be D1

612+D2 614+D3 616+D4 618+D5 620+D6 622, where, fore example, D1 612 is a distance between the cell one 610 and the cell two 630. The composite metric would be a sum of all the metric values for the MSO. Referring back to FIG. 5, composite metric would equal to M1+M2+M3+M4+M5+ M6+M7+M8+M9+M10+M11+M12+M13+M14+M15+ M16.

The MSO can also use a combination of the maximum distance calculations as represented by Table 2.1 and 2.2 and the iteration process as represented by FIGS. 5 and 6. Therefore, the MSO would assign all the values based on equations in Table 2.1 and 2.2 and thereby establish a baseline for the system. The MSO can randomly assign values to the cells and compute the distance metrics and composite metric. Thereafter, the MSO would continue the iteration process to determine if a better composite metric can be achieved.

Furthermore, adjoining MSOs can utilize the information determined by the Tables 2.1 and 2.2 to calculate the best possible color coding for the cells that adjoin the two MSO service areas (for example, MSO1 152 and MSO3 156 on FIG. 1). Therefore, a cell that is on the boundary of the MSO territory of a first MSO could be coordinated with a cell that is on the boundary of a second MSO. So, referring back to FIG. 5, a cellular user 502 should experience no interference from a cellular user 504 if the cellular user 502 is in cell one 510 and the cellular user 504 is in cell two 520 even if cell one 510 and cell two 520 are in different MSOs (for example, MSO1 152 and MSO3 156 on FIG. 1). If the two MSOs are coordinated, cell one 501 could be a part of the first MSOs network while cell two 520 could be a part of the second MSOs network but the color coding would still be configured for the highest available distance.

Using the calculation methods as described herein above, the theoretical best distance an MSO can achieve is 62.0545. This distance value will result from the distances as shown in Equation 2. This assumes that of six neighbor cells, one is the best distance, four are a good distance, and one is a fair distance. (Note that may not be possible in practice to achieve these best assignments.) An average distance can be achieved as shown in Equation 3. The worst case distance can be observed in Equation 4. (Note that the worst case distance also may not be achievable in practice, just as the best distance calculation may not be achievable.) As a result of these equations, a theoretical average improvement of 1.635 db and a maximum improvement of 3.606 db is calculated.

$$\text{Distance(best)}=12+4*6\sqrt{3}+6\sqrt{2}=62.0545 \quad \text{EQN 3}$$

$$\text{Distance(average)}=6*(12+4*6\sqrt{3}+6*6\sqrt{2}+4*6)/15=51.3924 \quad \text{EQN 4}$$

$$\text{Distance(worst)}=4*6+2*6\sqrt{2}=40.97056 \quad \text{EQN 5}$$

$$\text{Avg Improvement}=20\log(62.0545/51.3924)=1.6375 \text{ dB}$$

$$\text{Max Improvement}=20\log(62.0545/40.97056)=3.606 \text{ dB}$$

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for configuring color codes to base-stations of a Mobile Telephone Switching Office (MSO) of a cellular telephone network, the method comprising: assigning a first code of a plurality of codes to a first base-station of a plurality of base-stations; calculating a distance between the first code and a second code of the plurality of codes; determining a maximum calculated distance from the first code to a plurality of remaining codes of the plurality of codes; assigning the second code to a second base-station of the first MSO when the calculated distance between the first code and the second code matches the maximum calculated distance from the first code; wherein a wireless coverage cell of the second base-station is substantially adjacent to a wireless coverage cell of the first base-station; assigning a third code of the plurality of codes to a third base-station of the plurality of base-stations; calculating a first distance between the first code and the third code; calculating a second distance between the second code and the third code; determining a first ordered list of available distances that correspond to calculated first distances from the first code to the plurality of remaining codes; determining a second ordered list of available distances that correspond to calculated distances from the second code to the plurality of remaining codes; assigning the third code to a third base-station, such that the distance from the third code matches a greatest distance common to both the first ordered list and the second ordered list; wherein a wireless coverage cell of the third base-station is substantially adjacent to a wireless coverage cell of the first base-station and a wireless coverage cell of the second base-station.

2. The configuring method of claim 1, further comprising:
assigning a fourth code of the plurality of codes to a fourth base-station of the plurality of base-stations;
calculating a third distance between the second code and the fourth code;
calculating a fourth distance between the third code and the fourth code;
determining a third ordered list of available distances that correspond to calculated distances from the third code to the plurality of remaining codes;
assigning the fourth code to a fourth base-station, such that the distance from the forth code matches a greatest distance common to both the second ordered list and the third ordered list; wherein a wireless coverage cell of the fourth base-station is substantially adjacent to a wireless coverage cell of the second base-station and a wireless coverage cell of the third base-station.

3. The configuring method of claim 2, wherein the third base-station is base-station of a second MSO.

4. The configuring method of claim 1, wherein the first code is assigned to a plurality of base-stations coverage cells.

5. The configuring method of claim 1, wherein the calculation of distance between codes is measured in four dimensional space.

6. The configuring method of claim 1, further comprising the steps of: assigning, randomly, a fourth code to a fourth base-station; calculating a third distance metric between the first base-station and the fourth base-station; calculating a fourth distance metric between the second base-station and the third base-station; calculating a fifth distance metric between the second base-station and the fourth base-station;

and calculating a sixth distance metric between the third base-station and the fourth base-station.

7. The configuring method of claim 6, further comprising the step of computing a composite metric for the base-stations of the first MSO.

8. The configuring method of claim 7, further comprising iterating a new random assignment of the third code and the fourth code to determine a new code assignment.

9. The configuring method of claim 8, further comprising:
    calculating the composite metric for the base-stations within the first MSO; and
    iterating a new random assignment of the third code and the fourth code; wherein iterating is performed until a minimum composite metric is determined.

10. A method for configuring color codes of a cellular telephone network, the method comprising: assigning, randomly, a first code to a first base-station within a MSO and a second code to a second base-station within the MSO; calculating, in response to the assigning, a distance metric for a distance between the first base-station and the second base-station; and iterating a new random assignment comprising: de-assigning the first code from the first base-station; de-assigning the second code from the second base-station; assigning, randomly, the first code to a third base-station; and assigning, randomly, the second code to a fourth base-station; and computing a distance metric for the distance between the third base-station and the fourth base-station.

11. The configuring method of claim 10, further comprising computing a composite metric for the MSO.

12. The configuring method of claim 10, further comprising:
    computing the composite metric for the MSO; and
    iterating at least one random assignment for the first code to a nth base-station of a plurality of base-stations within the MSO and second code to a mth base-station of the plurality of base-stations within the MSO,
    computing a distance metric for the distance metric between the nth base-station and the mth base-station, wherein the step of iterating at least one random assignment is performed until a minimum composite metric is determined.

13. The configuring method of claim 10, wherein the code is reference by a color code.

14. A method for minimizing cross channel interference in a wireless telephone network, the method comprising: configuring a plurality of color codes within a first Mobile Switching Office (MSO), wherein the step of configuring comprises: assigning the first code to a first base-station within the first MSO; configuring the plurality of color codes within a second MSO, wherein the step of configuring comprises: assigning the second code to a second base-station within the second MSO; wherein the second code is assigned to the second base-station such that, if a cell of the second base-station is substantially adjacent to a cell of the first base-station within the first MSO, the second code is assigned to be a maximum available calculated distance from the first code, said maximum available distance being measure in four dimensional space; assigning a third code of the plurality of color codes to a third base-station; calculating a first distance between the first code and the third code; calculating a second distance between the second code and the third code; determining a first ordered list of available distances that correspond to calculated first distances from the first code to the plurality of remaining codes; determining a second ordered list of available distances that correspond to calculated distances from the second code to the plurality of remaining color codes; assigning the third code to a third base-station, such that the distance from the third code matches a greatest distance common to both the first ordered list and the second ordered list; wherein a wireless coverage cell of the third base-station is substantially adjacent to a wireless coverage cell of the first base-station and a wireless coverage cell of the second base-station.

15. The method of claim 14, wherein configuring the plurality of color codes within the first MSO further comprises:
    assigning, randomly, a fourth code to a fourth base-station within the first MSO;
    determining a distance metric between the first code and the fourth code; and
    computing a composite metric for the first MSO.

16. The method of claim 14, wherein configuring the plurality of color codes within the second MSO further comprises:
    assigning the second code to the second base-station in a substantially random manner;
    calculating a distance metric between the second code and the first code;
    computing a composite metric for the second MSO.

17. The method of claim 14, wherein the first code is assigned to a plurality of base-stations in said first MSO and said second MSO.

* * * * *